(12) United States Patent  
Savenok et al.

(10) Patent No.: US 8,688,631 B2
(45) Date of Patent: Apr. 1, 2014

(54) SYSTEM AND METHOD FOR MEDIA FILE SYNCHRONIZATION

(76) Inventors: Alexander Savenok, Grandview, MO (US); Pavel Savenok, Wheaton, IL (US); Dmitry Solovyev, Glenview, IL (US); Vassili Altynikov, Libertyville, IL (US)

(*) Notice: Subject to any disclaimer, the term of this patent is extended or adjusted under 35 U.S.C. 154(b) by 0 days.

(21) Appl. No.: 13/199,474

(22) Filed: Aug. 30, 2011

(65) Prior Publication Data

US 2012/0239617 A1    Sep. 20, 2012

Related U.S. Application Data

(63) Continuation-in-part of application No. 13/065,254, filed on Mar. 17, 2011, now Pat. No. 8,589,171, and a continuation-in-part of application No. 13/134,044, filed on May 26, 2011, now Pat. No. 8,478,719.

(51) Int. Cl.
*G06F 7/00* (2006.01)
*G06F 17/30* (2006.01)

(52) U.S. Cl.
USPC .......................................... 707/610; 707/640

(58) Field of Classification Search
None
See application file for complete search history.

(56) References Cited

U.S. PATENT DOCUMENTS

| | | |
|---|---|---|
| 6,345,252 B1 | 2/2002 | Beigi et al. |
| 6,829,368 B2 | 12/2004 | Meyer et al. |
| 6,990,453 B2 | 1/2006 | Wang et al. |
| 7,130,892 B2 | 10/2006 | Mukai |
| 7,277,766 B1 | 10/2007 | Khan et al. |
| 7,487,180 B2 | 2/2009 | Holm et al. |
| 7,516,074 B2 | 4/2009 | Bilobrov |
| 7,549,052 B2 | 6/2009 | Haitsma et al. |
| 7,624,012 B2 | 11/2009 | Le et al. |
| 7,627,477 B2 | 12/2009 | Wang et al. |
| 7,707,425 B2 | 4/2010 | Mihcak et al. |
| 7,711,564 B2 | 5/2010 | Levy et al. |
| 7,715,934 B2 | 5/2010 | Bland et al. |
| 7,853,344 B2 | 12/2010 | Khan et al. |
| 7,865,368 B2 | 1/2011 | Wang et al. |
| 7,873,521 B2 * | 1/2011 | Kurozumi et al. ............ 704/270 |
| 2001/0023429 A1 | 9/2001 | Barker et al. |
| 2002/0167548 A1 | 11/2002 | Murray |
| 2003/0195851 A1 | 10/2003 | Ong |
| 2004/0133548 A1 | 7/2004 | Fielding et al. |
| 2004/0215447 A1 | 10/2004 | Sundareson |
| 2005/0021808 A1 | 1/2005 | Rene |
| 2006/0050824 A1 * | 3/2006 | Kondo .......................... 375/354 |

(Continued)

*Primary Examiner* — Mariela Reyes
*Assistant Examiner* — Hexing Liu
(74) *Attorney, Agent, or Firm* — Meroni & Meroni, P.C.; Charles F. Meroni, Jr.; Christopher J. Scott

(57) ABSTRACT

Media files are drop box-synchronized to limit the amount of new functionality to which a user must grow accustomed in order to synchronize the content of a media player with a remote server within a cloud computing network. Thusly, users are not required to change the way they use their media player(s), but rather are required to use the familiar drag and drop functionality of their native media player. The present invention contemplates automatic versus interval file synchronization between host and nodal processing units via a server within native media player formats. This is achieved through the creation of a media file play list folder that acts as a drop box into which the user drops the desired play list to synchronize with the server. Certain methodology enhances and supports the synchronization process, which methodology incorporates the use of signature waveform metrics.

13 Claims, 12 Drawing Sheets

(56) References Cited

U.S. PATENT DOCUMENTS

| | | |
|---|---|---|
| 2006/0161864 A1 | 7/2006 | Windl |
| 2006/0200599 A1 | 9/2006 | Manchester et al. |
| 2007/0220592 A1 | 9/2007 | Muehlbauer |
| 2007/0244986 A1 | 10/2007 | Svendsen |
| 2007/0276668 A1 | 11/2007 | Xu et al. |
| 2007/0282848 A1 | 12/2007 | Kiilerich et al. |
| 2008/0071827 A1 | 3/2008 | Hengel et al. |
| 2008/0249982 A1 | 10/2008 | Lakowske |
| 2008/0256378 A1 | 10/2008 | Guillorit |
| 2008/0263360 A1 | 10/2008 | Haitsma et al. |
| 2008/0307246 A1 | 12/2008 | Rahman et al. |
| 2009/0089812 A1 | 4/2009 | Shin et al. |
| 2009/0205483 A1 | 8/2009 | Kim |
| 2009/0248713 A1 | 10/2009 | Park et al. |
| 2010/0005951 A1 | 1/2010 | Le et al. |
| 2010/0125644 A1 | 5/2010 | Silverman et al. |
| 2010/0211864 A1 | 8/2010 | Hengel |
| 2010/0228736 A1 | 9/2010 | Kahlbaum et al. |
| 2010/0257129 A1 | 10/2010 | Lyon et al. |
| 2012/0113964 A1* | 5/2012 | Petersen et al. ............... 370/338 |
| 2012/0216296 A1* | 8/2012 | Kidron ............................ 726/28 |

* cited by examiner

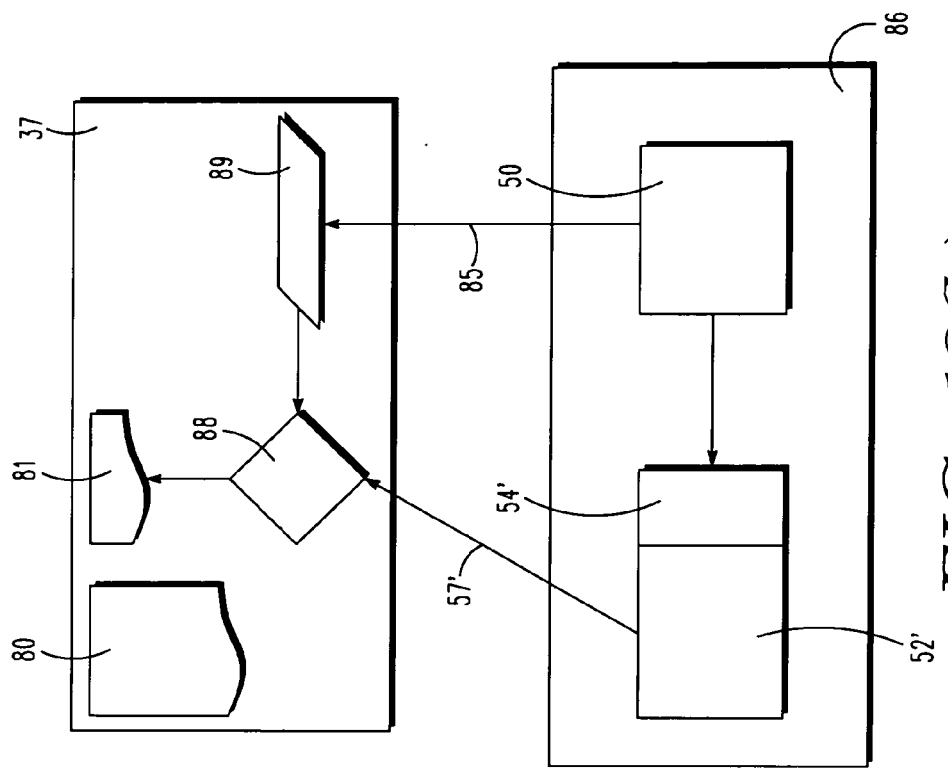
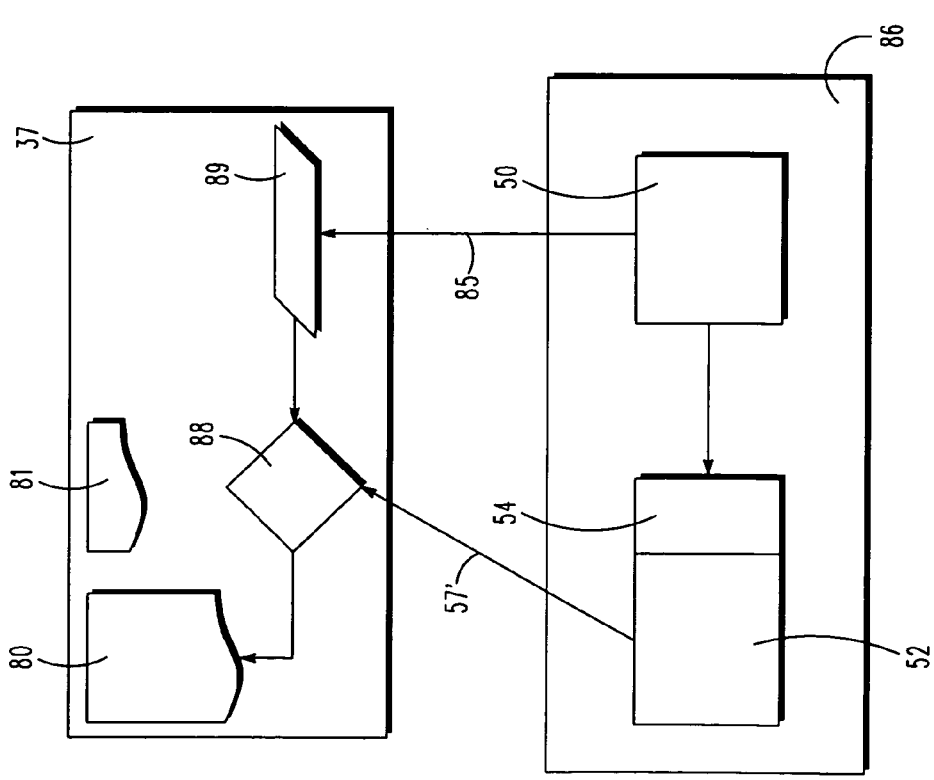

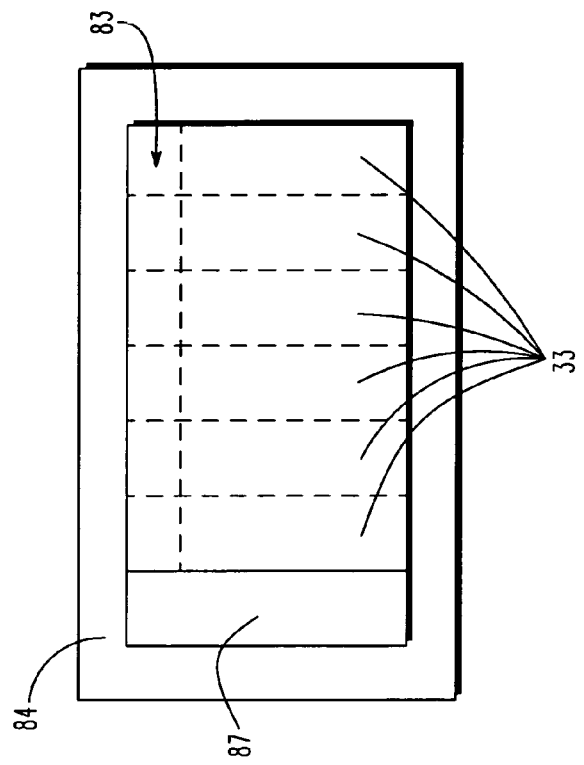
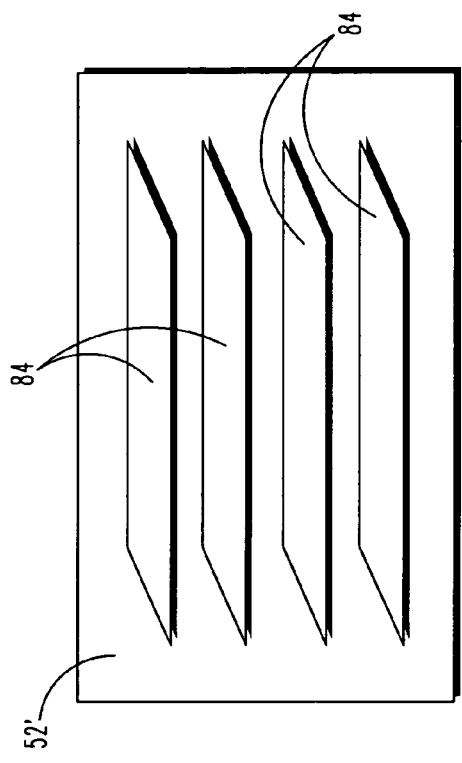
FIG. 19
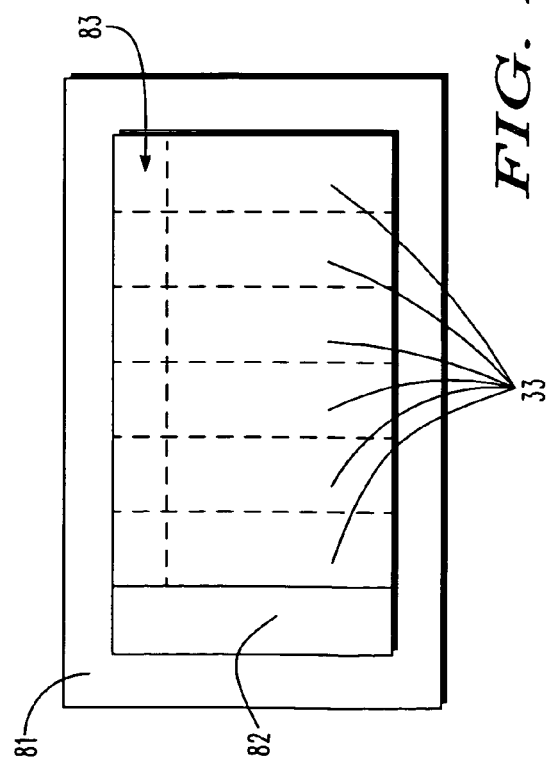
FIG. 20
FIG. 21

SYSTEM AND METHOD FOR MEDIA FILE SYNCHRONIZATION

PRIOR HISTORY

This application is a continuation-in-part patent application claiming the benefit of U.S. patent application Ser. No. 13/065,254 ('254 Application), filed in the United States Patent and Trademark Office on 17 Mar. 2011, now U.S. Pat. No. 8,589,171 and U.S. patent application Ser. No. 13/134,044 ('044 Application), filed in the United States Patent and Trademark Office on 26 May 2011, now U.S. Pat No. 8,478,719 the specifications of which applications are hereby incorporated by reference thereto.

BACKGROUND OF THE INVENTION

1. Field of the Invention

The present invention generally relates to system and method for media file synchronization. More particularly, the present invention relates to a system and method for custom file matching and synchronization by way of drag and drop functionality as provided to the user upon a graphical user interface.

2. Brief Description of the Prior Art

Play list folders may be used to identify which play list will be synchronized with a cloud computing network. A system directory (i.e. folder) that is used to synchronize with a remote server or another computer is often called a drop box. From a consideration of the state of the art, it will be noted that the prior art appears to be silent on a technique for extracting summary data from audio file amplitude information comprising various characteristic matching metrics for providing distinct audio file signatures for significantly decreasing the time associated with proper file matching, which file matching methodology may be utilized to compare, identify, and synchronize media files by way of drop box synchronization. Accordingly, the prior art perceives a need for fast-match methodology of the foregoing type for enabling and supporting drop box-type, media file synchronization as described and/or summarized in more detail hereinafter.

SUMMARY OF THE INVENTION

It is an object of the present invention to incorporate and/or apply certain means for finding audio/media file matches on different systems without the requirement of sending cumbersome loads of data or the audio/media files themselves. It is a further object of the present invention to incorporate and/or apply certain support means for determining which audio/media files should be synchronized within a certain system, and which audio/media files are already present within the systems and simply need to be referenced. Still further, it is an object of the present invention to incorporate and/or apply certain means to effectively find and locate redundant files so as to reduce storage costs by eliminating redundant file storage.

Still further, it is a primary object of the so-called media file drop box synchronization methodology according to the present invention to limit the amount of new functionality to which a user must grow accustomed in order to synchronize the content of a media player with a remote server within a cloud computing network. In this regard, it is contemplated that user would not be required to change the way the user uses a media player, but rather be required to use the familiar drag and drop functionality of the native media player.

Further still, it is a primary object of the present invention to provide localized data as otherwise reflected/stored on the remote server within the native media player for quick access for the purpose of audio/media playback, audio/media modification, etc. This is achieved through the creation of an audio/media file play list folder that acts as a drop box into which the user drops the play list he or she desires to synchronize with the server. Notably, the play list folder drop box is not a system level directory but rather a grouping of play lists that only exists at the level of the media player.

A user can drag-and-drop play list(s) in and out of such a play list directory. Dragging a play list into the folder indicates to the $3^{rd}$ party application according to the present invention that the user desires to synchronize that specific play list to the cloud. Removing a play list from this play list folder indicates that the user no longer desires to synchronize that specific play list with the cloud.

Accordingly, the system and method according to the present invention summarily comprises certain processing units within a cloud computing environment whereby a host processing unit or means communicates with nodal processing units or means via a remote server. Thus, the media file synchronization system preferably comprises certain communicating remote, host, and nodal processing means. The host processing unit is in communication with a user interface and comprises an application cooperable with the local media player operable via the host processing unit/means.

The media player means comprise play list folder generation means for visually displaying a drop box-enabled play list folder upon the user interface. Folder populating means further operable via said host processing means selectively populate the play list folder with a dynamic media file play list and listed tracks associated with the media file play list. File transfer means operable via the host and remote processing means function to transfer media file data intermediate the remote and host processing means; and synchronization means operable via the host and remote processing means synchronize drag-and-dropped changes to the playlist folder (s).

The synchronization means further rely upon and/or are supported by certain (1) data extraction means associated with the host processing means for enabling waveform data extraction from media file data; (2) summary statistic derivation means associated with the host processing means for deriving summary statistics from extracted waveform data; (3) custom marker generation means associated with the host processing means for generating a custom marker based on derived summary statistics; and (4) marker association means associated with the host processing means for respectively associating generated custom markers with the media file data for forming marked media file data.

BRIEF DESCRIPTION OF THE DRAWINGS

Other features of our invention will become more evident from a consideration of the following brief descriptions of patent drawings:

FIG. 18(*a*) is a first schematic representation depicting a nodal processing unit in communication with a host processing unit and depicting an automatic type file synchronization layout.

FIG. 18(*b*) is a second schematic representation depicting a nodal processing unit in communication with a host processing unit and depicting a user-initiated or interval type file synchronization layout.

FIG. 19 is a schematic representation depicting a media player box comprising a plurality of tracks.

FIG. 20 is a schematic representation depicting a track box with a uniform resource locator mechanism having a file header with segmented metadata files.

FIG. 21 is a schematic representation depicting a media/audio file box with a data duration mechanism having a file header with segmented metadata files.

DETAILED DESCRIPTION OF THE PREFERRED SYSTEM AND METHODOLOGY

Figure 1:
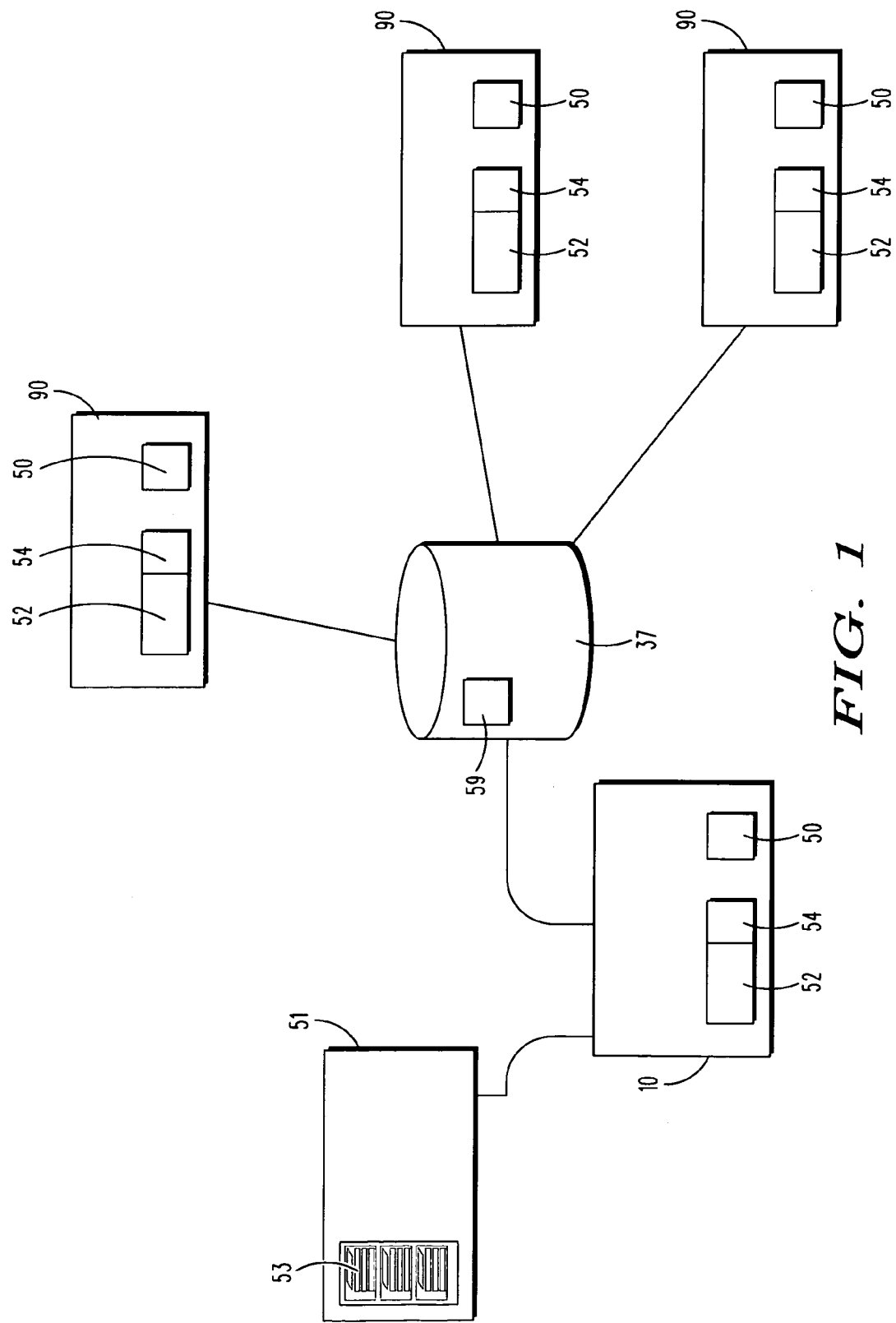
FIG. 1 is a first block type diagram of a basic cloud computing type data processing structure showing a host processing unit with attached graphical user interface in communication with a central server for linking/communicating the host processing unit with a series of nodal processing units.
Figure 2:
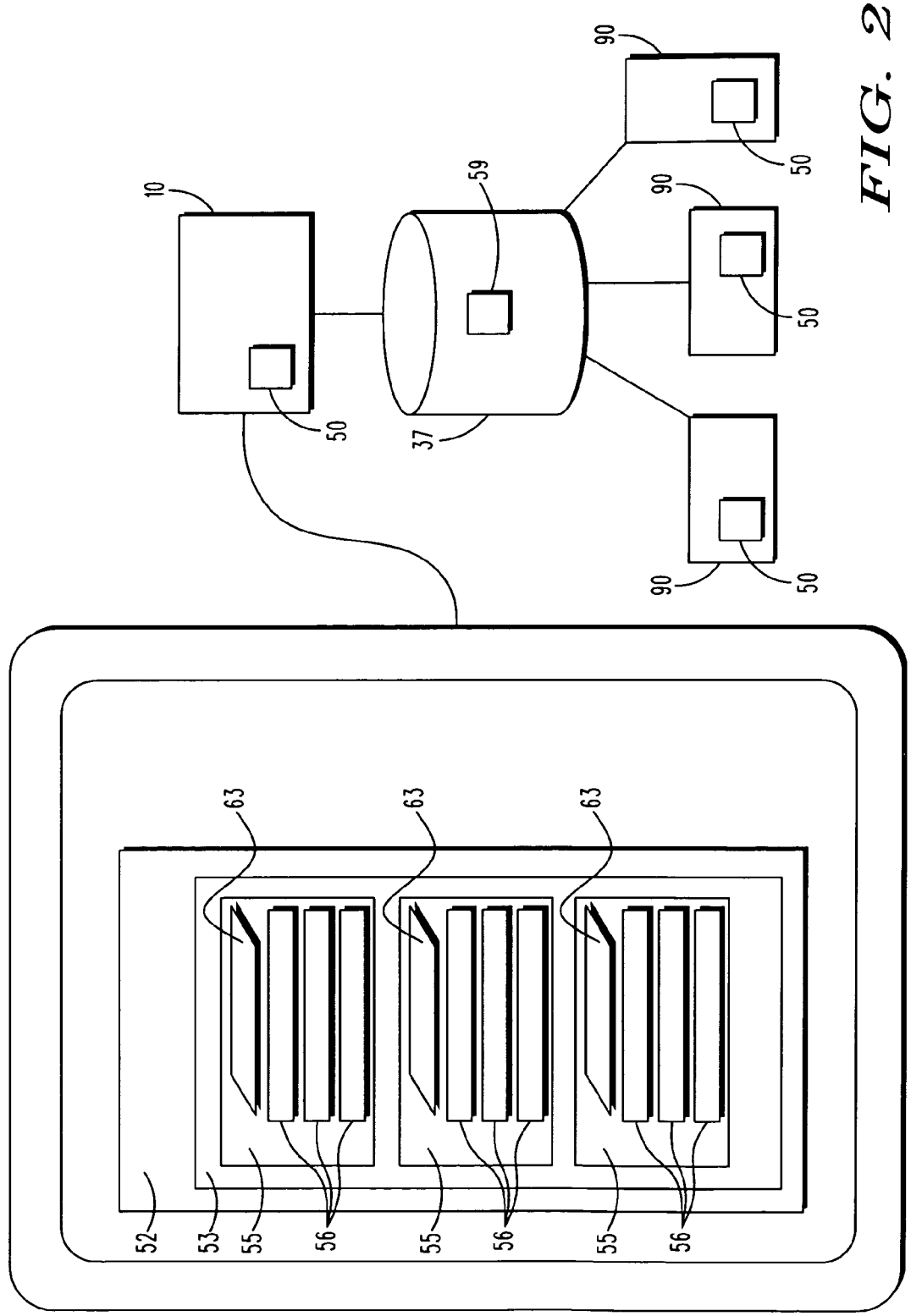
FIG. 2 is a second block type diagram of a basic cloud computing type data processing structure showing a host processing unit with attached and enlarged graphical user interface depiction in communication with a central server for linking/communicating the host processing unit with a series of nodal processing units.
Figure 3:
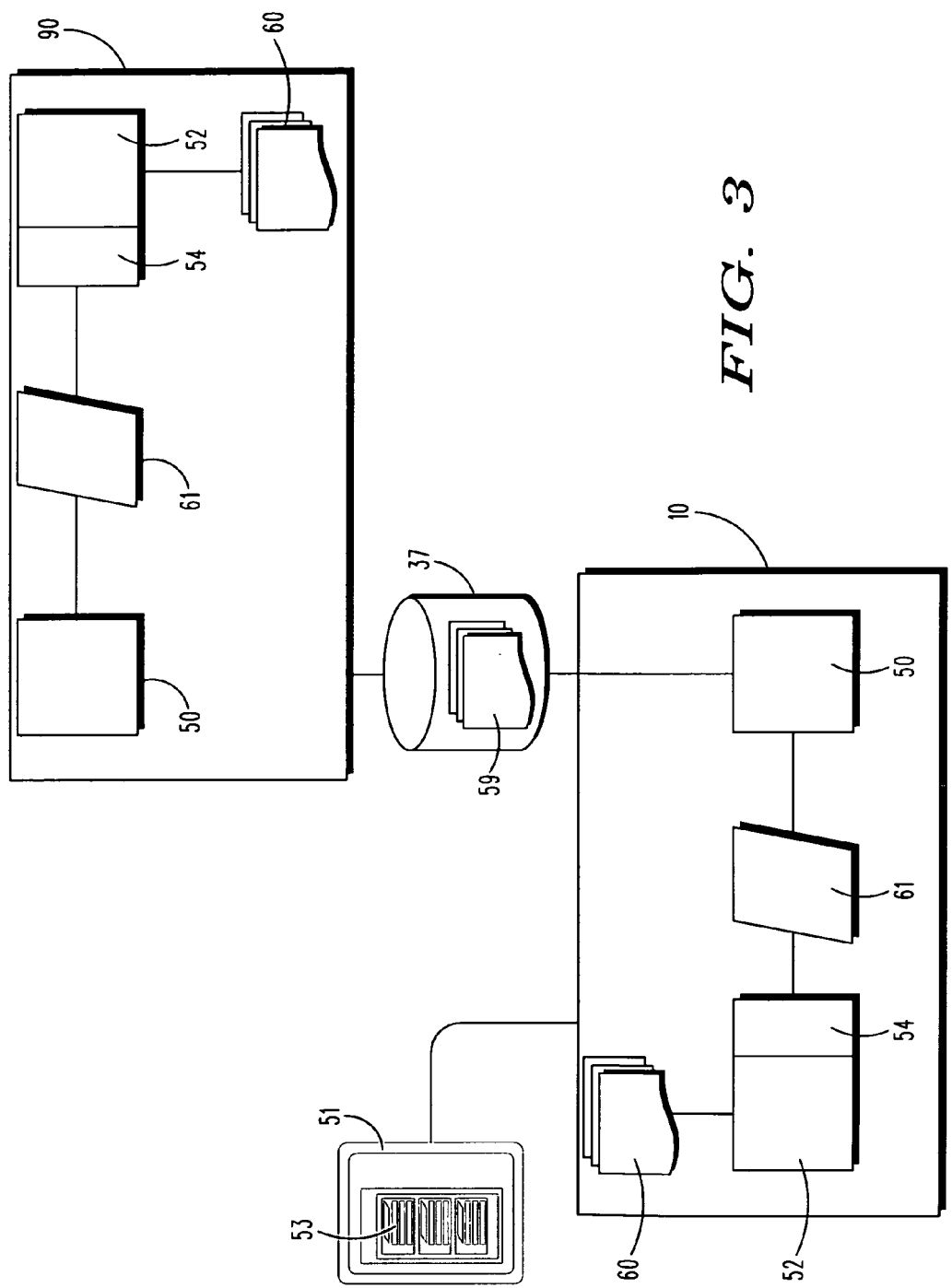
FIG. 3 is a third block type diagram showing a host processing unit with attached graphical user interface linked to a nodal processing unit via a central server.
Figure 4:
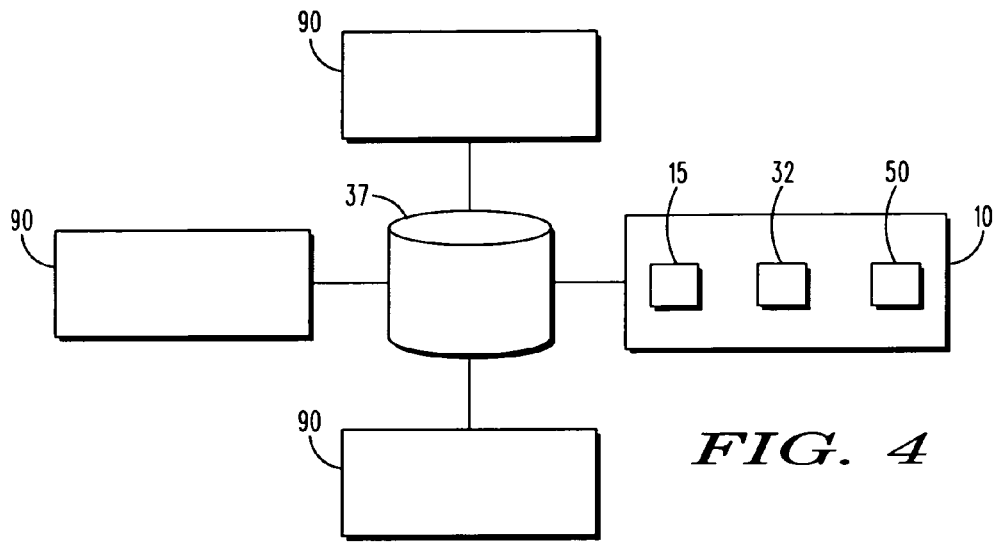
FIG. 4 is a fourth block type diagram of a basic cloud computing type data processing structure showing a host processing unit with application blocks in communication with a central server for linking/communicating the host processing unit to a series of nodal processing units.
Figure 5:
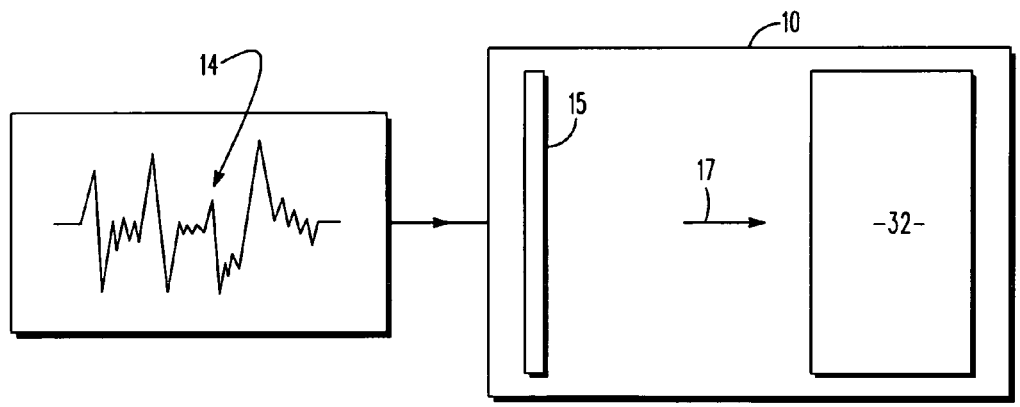
FIG. 5 is an enhanced diagrammatic depiction of a data processing arrangement according to the present invention showing a wave form data input block and a centralized host processing block, the latter of which comprises a waveform processing unit and a data output block.
Figure 6:
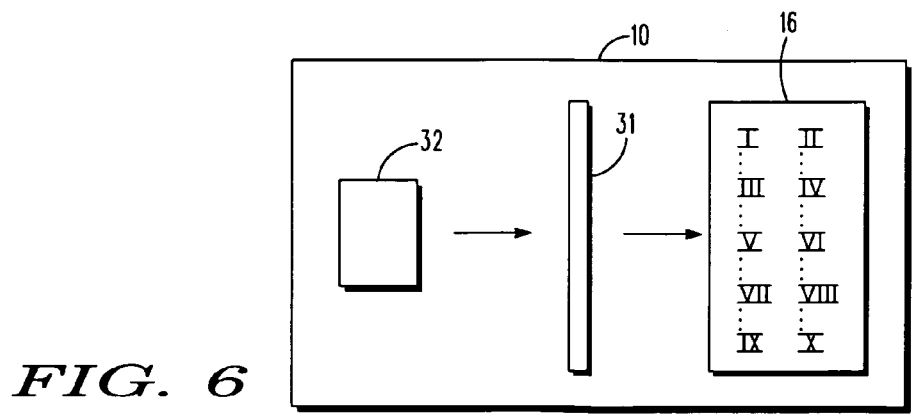
FIG. 6 is an enhanced diagrammatic depiction of a data processing arrangement according to the present invention showing the data output block from FIG. 5 being processed via an output processing unit and a secondary data output block.

Referring now to the drawings with more specificity, the present invention essentially concerns a system and method for media/audio file synchronization among a number of linked processing units as linked via a centralized/remote server. Rapid inter-component file data synchronization is enabled by way of (1) associating a uniquely constructed file-identifying fingerprint or marker with a media/audio file 59; (2) matching media/audio files 59 by way of the uniquely constructed file-identifying markers or fingerprints; and (3) drag/drop functionality of playlist changes upon a graphical user interface.

The present invention firstly contemplates a desktop application 50 operable by way of a user's graphical user interface 51 in communication with a host processing unit or means as diagrammatically depicted and referenced at 10. It is contemplated that the host processing means 10 are in communication with a cloud computing type network and thus certain nodal processing units or means as at 90 are in communication with the host processing means 10 via certain remote or server processing means as at 37.

It is contemplated that soon after the installation of the desktop application (as diagrammatically depicted and referenced at 50) is complete the user may preferably be visually prompted upon the graphical user interface 51 to select one or more drop box(es) as at 53 to synchronize with a local or host media player application as diagrammatically depicted and referenced at 52. If there are no drop boxes 53, the user may be prompted to create a new drop box 53 via the desktop application 50.

If the user decides to create a new drop box 53, the desktop application 50 comprises certain play list folder generation means for enabling the user to create a new play list folder or drop box 53 in local media player 52 via an application programming interface (API) 54 associated with the player 52. If the user decides to synchronize an existing drop box as at 64 located at the remote processing means or server 37, then the desktop application 50 may create a new play list folder or drop box 53 in the local media player 52 via the player's API 54.

The desktop application 50 further preferably comprises certain folder population means for populating the generated play list folder(s) or drop box(es) 53 with play lists 55 and their respective tracks 56, and initially drives/creates URL streams 57/58 for media files 59 stored at the remote processing means 37. Any tickets related to the action are preferably removed.

If the user elects to store the copies of the media files 59 for the drop box 53 on the host processing means 10, the desktop application 50 initiates the transfer (download) of media file data from the remote processing means 37. When the media file data transfer is complete, the URL stream(s) 57/58 are preferably replaced with standard track(s) 56 referencing the local file(s) as at 60.

When the user wishes to make any changes to the play list status or structure, the desktop application 50 (automatically) initiates the synchronization process. In this regard, the application 50 contemplates certain play list surveillance means 61 for monitoring the play list status and comparing the play list status against an index of the play list folder or drop box 53 of the desktop application 50. It is contemplated that the surveillance means 61 are preferably and essentially background routines/processes that are executed every few minutes by way of the API 54 of the local or host media player 52.

Should the user elect to drag-and-drop a play list 55 into a drop box-enabled play list folder or drop box 53, the dragged/dropped play list 55 is broken down into track-based waveform data 14 and analyzed for rendering respective media file signatures for the individual files/tracks 56 of the play list 55. Certain data extraction means 13, as exemplified by an audio analysis plugin 15, are associated with the host processing means 10 for enabling waveform data extraction from the waveform media file data 14. The process of extracting waveform data provides signature values 32, which may then be further processed via certain metric derivation means 31 for rendering or deriving matching metrics 16.

For example, when wave form data 14 are analyzed by the audio analysis plugin 15, various values 32 may be rendered or output 17 from the wave form audio file data 14. The values 32 may then be processed via certain metric derivation means 31 for deriving or rendering the so-called matching metrics 16.

Figure 7:
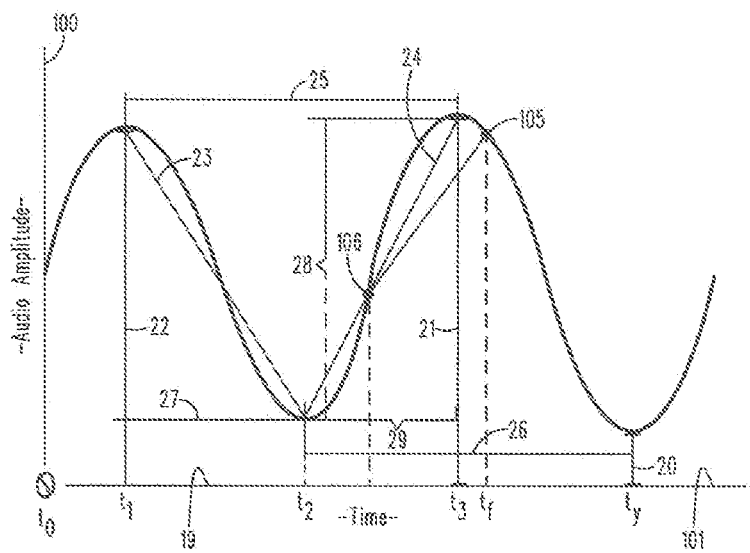
FIG. 7 is a graphical depiction of a generic sinusoidal waveform depicting audio amplitude information/data as a function of time.
Figure 8:
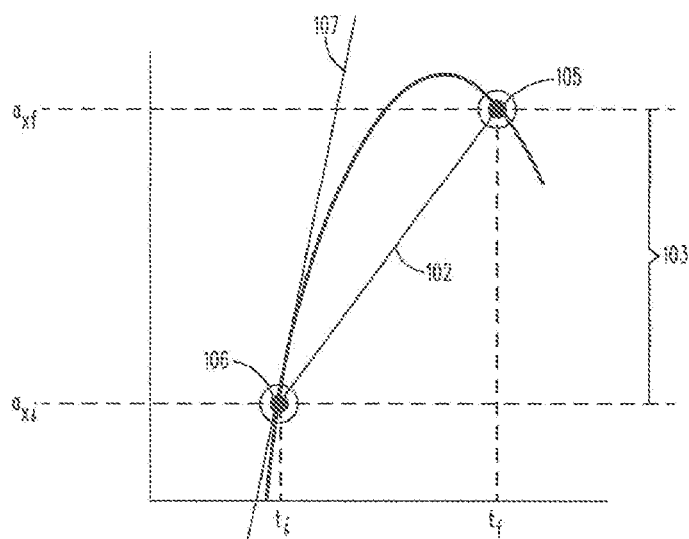
FIG. 8 is an enhanced fragmentary graphical depiction of a portion of the generic sinusoidal waveform otherwise depicted in FIG. 7 showing a tangent slope at a point on the waveform.
Figure 9:
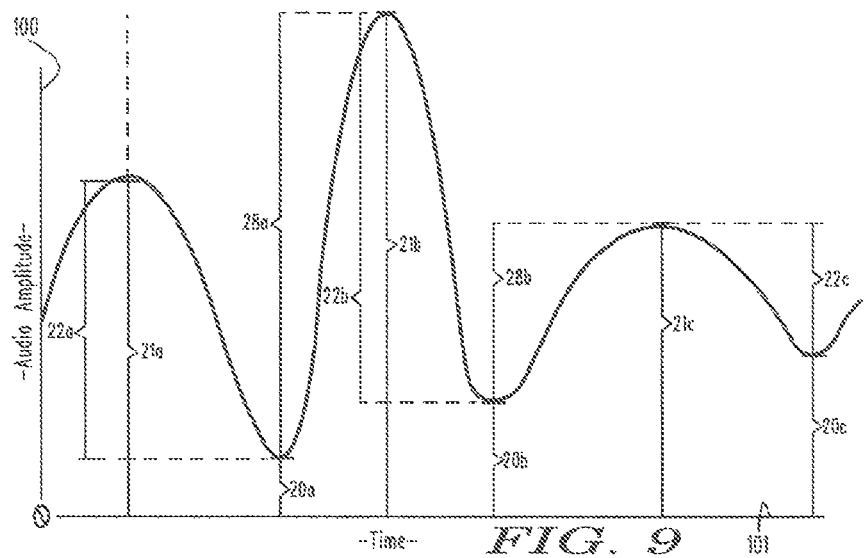
FIG. 9 is a first graphical depiction of a non-uniform waveform depicting audio amplitude information/data as a function of time with vertical wave components or length segments being highlighted.
Figure 10:
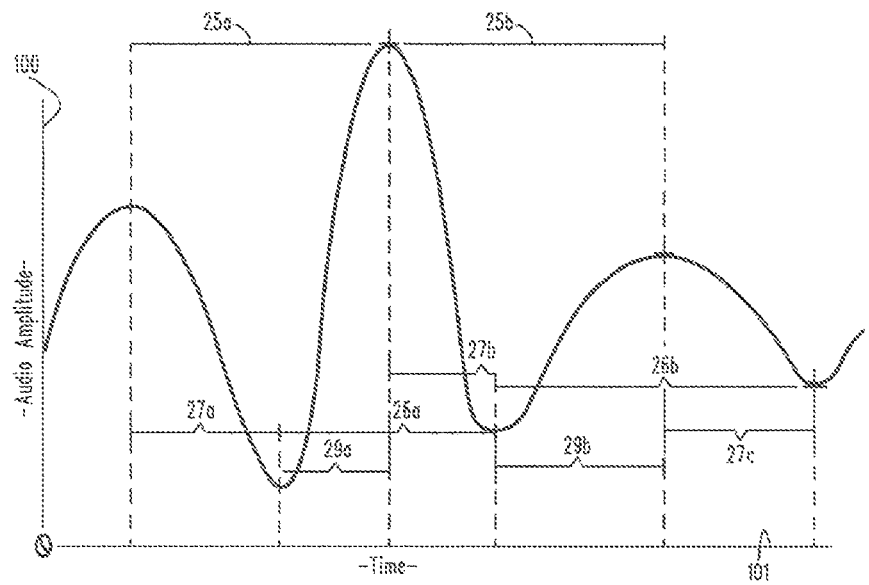
FIG. 10 is a second graphical depiction of a non-uniform waveform depicting audio amplitude information/data as a function of time with horizontal wave components or length segments being highlighted.
Figure 11:
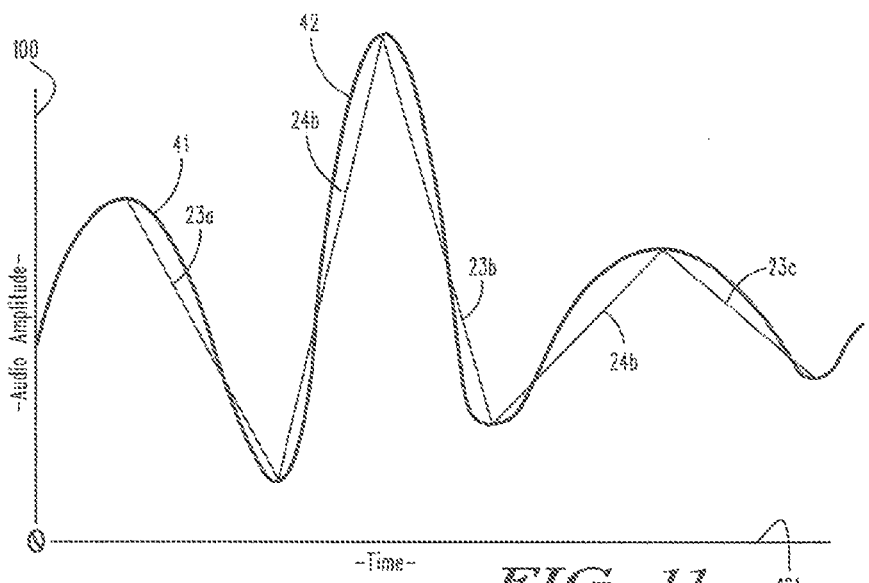
FIG. 11 is a third graphical depiction of a non-uniform waveform depicting audio amplitude information/data as a function of time with sloped wave components or length segments being highlighted.
Figure 12:
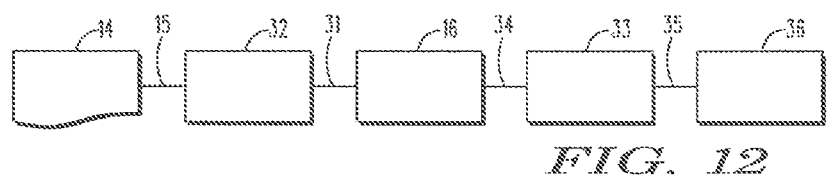
FIG. 12 is a flow diagram showing five blocks separated by four processes/processing units/routines.
Figure 13:
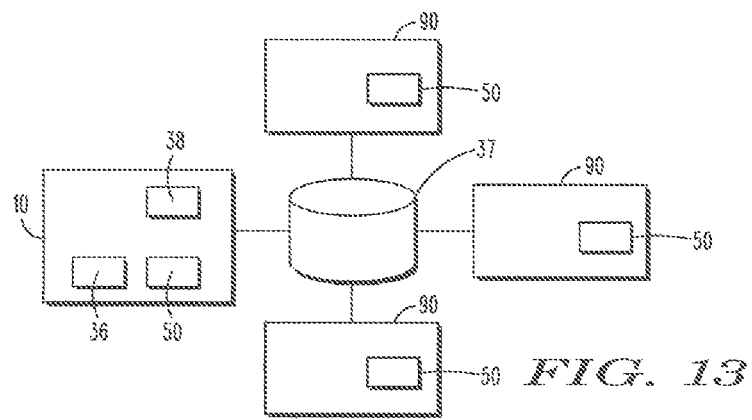
FIG. 13 is a block diagram of a basic data processing structure showing a host processing block comprising two processing units connected to a server for linking the host processing block to nodal processing blocks.
Figure 14:
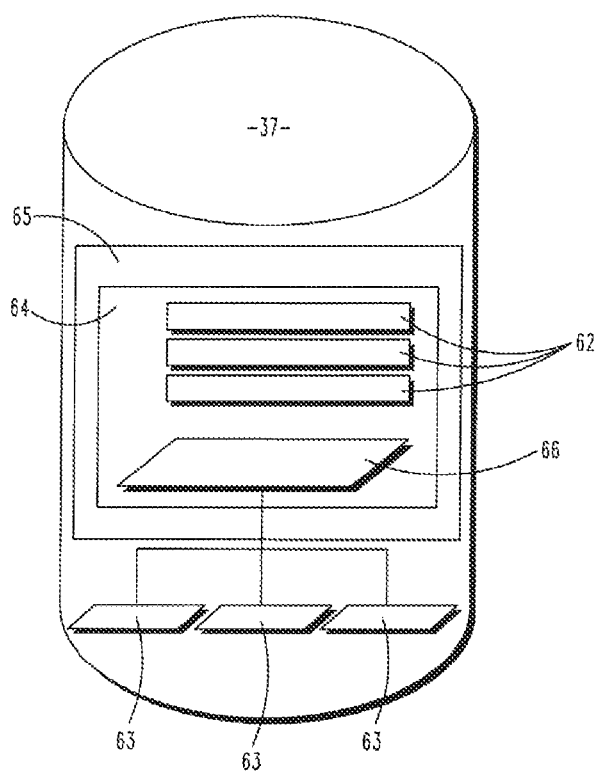
FIG. 14 is an enlarged diagrammatic depiction of a server diagrammatically depicting architecture therewithin.
Figure 15:
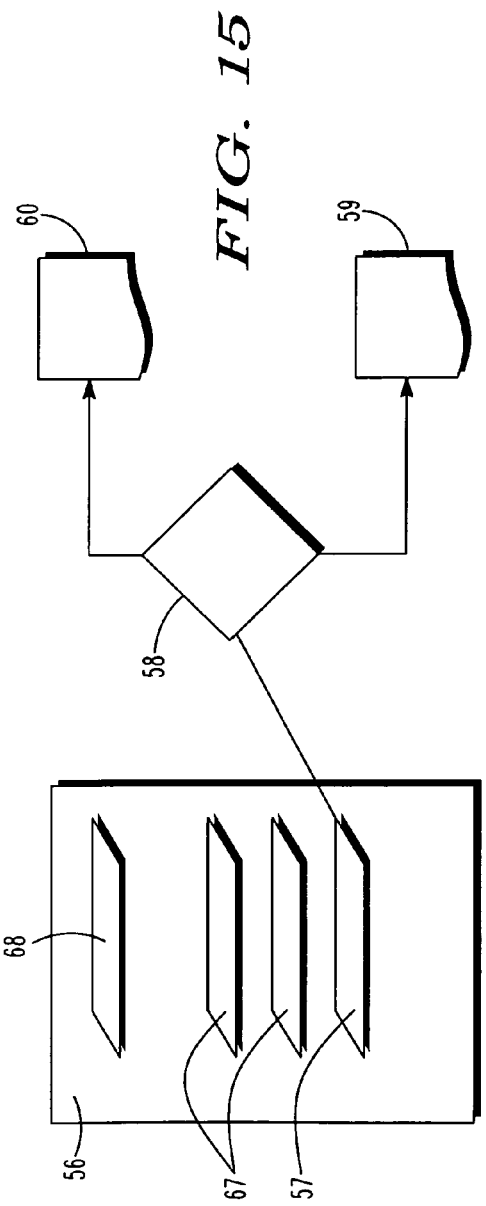
FIG. 15 is a flowchart type depiction of track-level, host-nodal side architecture according to the present invention.
Figure 17:
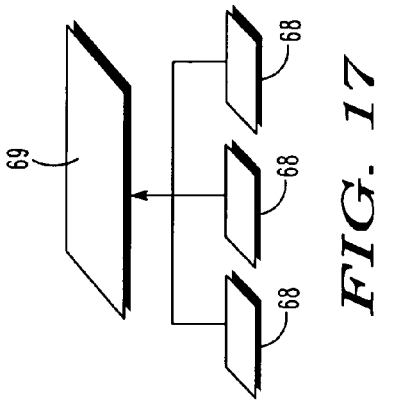
FIG. 17 is a flowchart type depiction of linkage intermediate the track-level, server side architecture and track-level, host-nodal side architecture according to the present invention.
Figure 16:
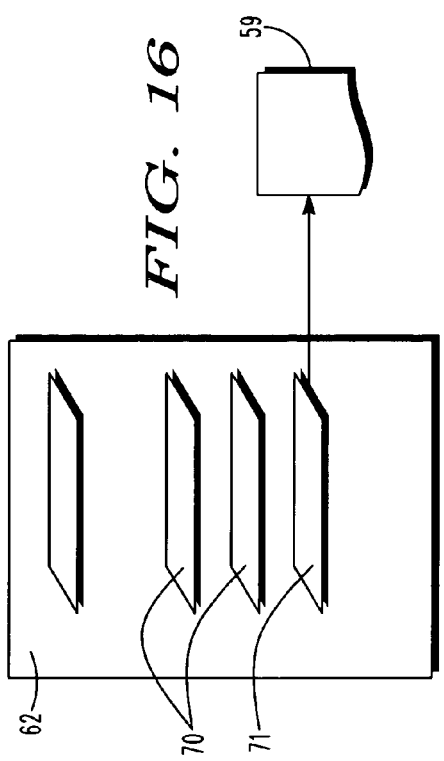
FIG. 16 is a flowchart type depiction of track-level, server side architecture according to the present invention.

In this regard, the reader will note from FIG. 7 a generic sinusoidal wave 18 positioned adjacent baseline 19 in which waveform amplitude data (e.g. decibel level) are portrayed along the Y-axis 100 as a function of time as portrayed along the X-axis 101. It will be understood that wave form data (as at 14) as mapped and positioned adjacent a baseline (as at 19) may thus render various values 32.

The various values 32 are contemplated to include, but not be limited to: a trough height or trough-to-baseline distance or length segment as at 20; a peak height or peak-to-baseline distance or length segment as at 21; a vertical peak-to (rightly adjacent)-trough distance or length segment as at 22; a horizontal peak-to (rightly adjacent)-trough distance or length segment s at 27 (defining a certain time segment or Δt); and a peak-to-trough hypotenuse length segment (joining length segments 22 and 27, and having a certain slope) as at 23.

Further, the various values 32 are contemplated to include, but not be limited to: a vertical trough-to (rightly adjacent)-peak distance or length segment as at 28; a horizontal trough-to (rightly adjacent)-peak distance or length segment as at 29 (defining a certain time segment or Δt); a trough-to-peak hypotenuse length (joining length segments 28 and 29, and having a certain slope) as at 24; a peak-to-peak distance 25 (defining a certain time segment or Δt); and a trough-to-trough distance 26 (i.e. defining a certain time segment or Δt).

The values extracted from the wave form media file data 14 may thus be subjected to various statistical analyses for providing the matching metrics 16. By way of example, given a continuous waveform or wave form media file data 14, a number of trough-to-baseline distances or length segments 20 may be ascertained extending across a range of values with a certain arithmetic average and having certain variability associated therewith.

Thus, it is contemplated that various statistical values including but not limited to the mean, range, and standard deviation values may be calculated for the trough-to-baseline distances or length segments (as at 20) of certain given audio file waveform data 14. In this regard, the mean may be defined by as an arithmetic average of the trough-to-baseline length segments 20 of the values 32. To find a mean, scores or distances or length segment values may be summed and divided by the number of scores, distances, or length segment values per the following equation:

$$\overline{X} = \frac{\Sigma X}{N}$$

where $\overline{X}$=the mean
$\Sigma$=an instruction to add or sum
X=the numbers or values symbolized by X
N=the number of X's It will be seen that three (3) successive trough-to-baseline distances or length segments have been depicted and referenced at 20a, 20b, and 20c. The mean of the trough-to-baseline distances or length segment values may thus be exemplified by the trough-to-baseline distances or length segment values depicted and referenced at 20a, 20b, and 20c. If the values are added/summed and divided by three, for example, an arithmetic average or mean is provided.

In other words, If trough-to-baseline distance or length segment 20a has a value of two (2); trough-to-baseline distance or length segment 20b has a value of four (4); and trough-to-baseline distance or length segment 20c has a value of six (6); the mean may be calculated to have a value of four (4) since the sum of the values is twelve (12), and the number of values is three (3) (twelve (12) divided by three (3) equals four (4)).

Similar calculations may be carried out for (1) the peak-to-baseline distances or length segments 21a, 21b, and 21c; (2) the vertical peak-to-(rightly adjacent)-trough distances or length segments 22a, 22b, and 22c; (3) the horizontal peak-to-(rightly adjacent)-trough distances or length segments 27a, 27b, and 27c; and (4) the peak-to-trough hypotenuse length segment 23a, 23b, and 23c.

The reader is further directed to (5) the vertical trough-to-(rightly adjacent)-peak distances or length segments 28a and 28b; (6) the horizontal trough-to-(rightly adjacent)-peak distances or length segments 29a and 29b; (7) the trough-to-peak hypotenuse length segment 24a and 24b; (8) the peak-to-peak distances or length segments 25a and 25b; and (9) the trough-to-trough distances or length segments 26a and 26b.

Each respective set of length segment values may thus be summed and the resulting sum sets divided by the number of values in each set to render an arithmetic mean for the respective set. In addition to the means, range values and standard deviation values for each given set may also be calculated to provide additional and characteristic statistical signatures for the wave form data 14. All statistical metrics can then be utilized to provide a robust file-identifying marker or fingerprint for the given wave form data 14 of a media/audio file 59.

With regard to the range, the same may be defined as the upper limit of the trough-to-baseline distance or length segment 20 with the greatest magnitude (i.e. the highest score or value) minus the lower limit of the trough-to-baseline distance or length segment with the lowest magnitude (i.e. the lowest score) as per the following equation:

$$\text{range} = X_H - X_L$$

where $X_H$=upper limit of the highest or greatest trough-to-baseline distance; and
$X_L$=lower limit of the lowest or least trough-to-baseline distance.

Three (3) successive trough-to-baseline distances or length segments have been depicted and referenced at segments 20a, 20b, and 20c. In this example, length segment 20a would appear to represent the trough-to-baseline distance or length segment having least magnitude or value, and length segment 20c would appear to represent the trough-to-baseline distance or length segment of greatest magnitude. If trough-to-baseline distance or length segment 20a were assigned a value of 2 and the trough-to-baseline distance or length segment 20c were assigned a value of 6, the range might then be calculated to have a value of 5 (since the lower limit of 2 in this example is 1.5 and the upper limit of 6 in this example is 6.5).

With regard to the parameter/statistic of standard deviation, it is noted that the same is a measure of variability of a given set of scores such as distances, length segments, or values, and may be given by the following formula:

$$\sigma \text{ or } S = \sqrt{\frac{\Sigma X^2 - \frac{(\Sigma X)^2}{N}}{N}}$$

where σ=standard deviation of a population;
S=standard deviation of a sample
N=number of deviations (or number of scores/distances/values)
$\Sigma X^2$=sum of the squared scores/distances/values
$(\Sigma X)^2$=square of the sum of the raw scores/distances/values When auditory amplitude data (e.g. intensity) are mapped as a function of time, the resulting data may define a signature waveform. Rather than extracting all the auditory amplitude data from the waveform, the present invention extracts key values, and derives file-matching metrics from the values as exemplified by the foregoing values 32 to provide a signature or fingerprint or custom marker for the respective audio file data 14 so as to quicken the overall matching process without sacrificing accuracy.

It is contemplated that the foregoing are but examples of the types of data that may be extracted from a given waveform. Other statistical features and/or values may be extracted so as to render the custom marker for insertion and/or association with the respective media/audio file 59. For example, peak-to (rightly adjacent)-trough arc length (or portion(s) thereof) values as at 41 and/or trough-to (rightly adjacent)-peak arc length (or portion(s) thereof) value as at 42 could also be extracted, and statistical values derived therefor.

Further, suppose an auditory signal has a certain amplitude magnitude A at time $t_i$ and a certain amplitude magnitude A at time $t_f$. The average amplitude magnitude $\overline{A}_x$ of the audio signal may be defined as the change in amplitude $\Delta a_x$, divided by the time interval $\Delta t$ during which that change occurred as per the following equation:

$$\overline{A}_x \equiv \frac{\Delta a_x}{\Delta t} = \frac{a_{xf} - a_{xi}}{t_f - t_i}$$

where $\overline{A}_x$ is depicted and referenced at 102, $\Delta a_x$ is depicted and referenced at 103, and $\Delta t$ is depicted and referenced at 104.

Notably, the value of the average amplitude magnitude $\overline{A}_x$ may be different over different time intervals. It is therefore useful to define the instantaneous amplitude magnitude as the limit of the average amplitude magnitude as $\Delta t$ approaches zero. If point 105 is brought closer to point 106, and the limit of $\int \Delta a \int _x/\Delta t$ is taken as $\Delta t$ approaches zero, the instantaneous amplitude magnitude (or slope) may be found as at 107.

In other words, it is contemplated that the slope (as at 107) of the waveform data at any given time may also be extracted and utilized to provide a file-identifying fingerprint or marker for the audio file waveform data 14.

It will thus be understood from an inspection of the various figures that the values at 20, 21, 22, and 28 are static length segment values based on instantaneous time selections; the values 25, 26, 27, and 29 may be viewed as either static length time segment values or time segment values; and the values 23 and 24 may be viewed as length segment values or time-based derivative values dependent upon select choice of the $\Delta t$ component. In this regard, it is contemplated that in some situations, the slope values may significantly differ over different time intervals, and thus it may thus be useful to define the instantaneous slope as a limit of the average slope as $\Delta t$ approaches zero.

It will thus be seen that the data extraction means 13 according to the present invention may well function to render certain amplitude values 32, from which values 32 certain summary statistics or metrics 16 may be derived and thus the present system and method contemplate that the data extraction means 13 may well support certain statistic/metric derivation means 31 as provided by way of certain proprietary testing/software designed to render the matching metrics 16 as exemplified by the foregoing statistics/parameters.

To further bolster the accuracy of the matching metrics 16, it is contemplated that values for each of the distances, length segments and/or slopes may be summarized by a set of summary statistics inclusive of the mean values, range values, and standard deviation values otherwise calculated for the values 32. In other words, the arithmetic average (i.e. the mean) of all the means for the various amplitude aspects could conceivably be calculated and included as a matching metric to bolster the accuracy of the signature or fingerprint or marker.

Still further, in addition to extraction of values 32 and matching metrics 16 from the wave form audio file data 14, it is contemplated that an audio file duration parameter/statistic or metric may be included among the matching metrics 16 to further bolster signature accuracy. In other words, respective media/audio files 59 necessarily comprise a signature duration, and the duration aspect or feature of the respective media/audio files 59 may thus contribute to the authenticity or accuracy of a given file marker.

In this last regard, it is contemplated that the resulting summary statistics or matching metrics 16 may then be inserted into or otherwise embedded in the metadata 33 of the media/audio file 59 using a custom file-identifying fingerprint or marker such as an (extended) ID3 tag. It is noted that tags of this type offer, provide, or enable relatively rapid file matching via file comparison means or operators. Thus, the ID3 tag or similar other custom marker, can be accessed very quickly when trying to find a possible match.

The media file matching metrics 16 are extracted and sent along with the play list data (comprising certain play list identification(s) 63) to the remote processing means as at 37. The file matching metrics 16 are compared against a database of file metrics stored at the remote processing means 37 whereafter any matches are identified and a list of all non-matching, missing files is created and communicated back to the desktop application 50 at the host processing means 10. The desktop application 50 then starts transferring (e.g. uploading) all non-matching, missing files.

In this last regard, it is contemplated that it would be possible (depending on user bandwidth) to communicate directly with nodal processing means 90 instead of via the remote processing means 37 if a given desktop application were in place to determine both the external IP and internal IP, and enable file streaming from the host processing means 10 during file/data transfer. Further, streaming from the network application and any networked device would be possible, if local media player means were able to play URL streams.

The transferred (e.g. uploaded) play list 55 is then re-created on the remote processing means 37 via certain play list re-creation means using the data sent from the host processing means 10 and all the media files 59 located at the remote processing means 37 (that have been matched with local files via the fast match process (described hereinabove)) are referenced within the tracks 56.

It is contemplated that tracks 62 with missing files could be disabled and the user provided with visually highlighted reference to the disabled status (e.g. track titles could be italicized on the remote processing instance of the play list drop box 64). The otherwise disabled tracks 62 are enabled once the synchronizing data transfer or upload from the host processing means 10 is complete. The remote processing instance of the play list 64 is held within the remote processing instance of a drop-box, which drop box may be accessed through a network application 65 hosted at the remote processing means 37.

A global identification 66 is preferably generated at the remote processing means 37 linking all local instances of the play list or drop box 53 and the remote processing instance 64 by creating a relationship between local play list identification(s) 63 and the generated global identification 66. As stated, once the data transfer/upload is complete, the tracks are enabled at the remote processing means 37, and all nodal processing means 90 are sent data to re-create the play list or drop box 53 and find possible matching local files 60.

The play list drop boxes 53 are created by the desktop application(s) 50 via the API 54 of the media player means 52 and the tracks 56 are initially created as URL streams 57/58. A given local play list identification 63 is returned to the remote processing means 37 in order to link the new local play list drop box 53 to the remote processing instance 64. Any tickets related to the action are removed.

Should the user elect to store the media files for the drop box 53 on the local processing means 10 in addition to storing the files with the remote processing means 37, the matching metrics 16 that were sent are used to locate any possible matching files 60. This task is completed exclusively by the desktop application 50, which application which maintains a repository of the matching metrics 16 for the files 60 referenced in the media player 52.

References to the local matching files 60 then replace the URL streams 57/58 within the play list drop box 53, and the data transfer (e.g. download) of all missing files is then initiated. Once the transfer/download of media file data is completed, the URL stream is replaced with a standard track 56 having a reference to the local file 60.

Synchronization conflicts will typically be resolved by timestamp precedence whereby the later changes are given precedence. A noted exception to the conflict resolution scheme is in a synchronization scenario requiring that a file be replaced by another that is smaller in size. In said scenario, it is contemplated that the user may be preferably prompted either reverse the changes or continue.

Given a synchronization scenario in which one of the synchronized devices or nodal processing units 90 is unavailable, it is contemplated that the remote processing means 37 will create a ticket for the specified action. Upon availability of the nodal processing unit 90 (e.g. at start up), the local desktop application 50 will retrieve the ticket for the specified action. All conflicting tickets will be resolved as described with regard to synchronization conflicts hereinabove.

Should the user elect to create a new play list 55 within an existing play list folder drop box 53, the application 50 will either receive an event notification concerning a play list 55 being created, or the application 50 will detect a change in the content of the play list folder/drop box 53 by comparing it content against an index of the play list folder drop box 53 that is held on the local desktop application 50. As earlier described, this would be done through a background process run every few minutes using the local media players API 54.

The new play list title and it local identification 63 are transferred to the remote processing unit or means 37 via the desktop application 50. A remote processing instance of the play list drop box is created 64 and a global identification 66 is generated linking/communicating the newly created local play list drop box 53 and the remote processing instance of the play list drop box 64.

Media file data are sent to all the nodal processing units or means 90 to re-create the play list 55 and/or drop box 53. This is done by the desktop application 50 via the media player API 54. The desktop application 50 then reports the local play list identification 63 to the remote processing unit 37 to establish a relationship between the new play list 55 or drop box 53 and the remote processing instance of the drop box 64. Any tickets related to the action are preferably removed.

As stated previously, all synchronization conflicts will be resolved by time-stamping, the later changes being given precedence, except in synchronization scenarios requiring that a file be replaced by another that is smaller in size, in which case the user is prompted to either reverse the changes or continue. If one or more of the nodal processing units 90 is/are unavailable during the synchronization event, the remote processing unit 37 will create a ticket for the specified action, which the local desktop application 50 will retrieve once it becomes available (e.g. at start-up). All conflicting tickets will be resolved as heretofore described.

Should the user elect to delete a play list 55 (or track 56) from the play list folder/drop box 53, the application 50 will either (1) receive an event notification concerning a play list 55 (or track 56) being deleted, or (2) detect a change in the content of the play list folder/drop box 53 by comparing its content against an index of the play list folder 53 that is held on the host or local desktop application 50. This would be done through the aforementioned background periodic surveillance or monitoring routine 61 using the local media players API 54.

It is contemplated that the user may preferably be prompted in order to confirm the deletion of the play list 55, whereafter the identification 63 of the deleted play list 55 is sent to the remote processing unit 37. The remote processing means 37 then delete the remote processing instance of the play list 64. Based on user preference one of two things will occur, as follows (1) the media files 59 are not deleted and are still accessible through the main library of the web application 65, or (2) the media files 59 are deleted from the remote processing unit 37.

The remote processing server or unit 37 sends data to initiate the removal of all related play list 55 on the nodal processing units 90. This is done via the desktop application 50 utilizing the local media player API 54. The user is prompted to confirm the removal of the play list 53 on each nodal processing unit 90. If the user decides to undo the removal, data is sent to the remote processing unit or server 37 by the desktop application 50 thereby re-creating the previously deleted play lists 55/64. This process would be identical to methodology for play list addition via drag-and-drop functionality.

Notably, the relationship between the global identification 66 and the local play list identification 63 is not broken until the specified local play list 55 is deleted. Once all local play lists 55 have been deleted, the events are reported to the remote processing center or server 37, where upon the global identification 66 is also deleted. Any tickets related to the action are preferably removed. All synchronization conflicts are resolved and all unavailable devices are treated as heretofore described.

Should a user elect to remove a play list 55 (or track 56) from a play list folder/drop box 53, the application 50 will either (1) receive an event notification concerning a play list 55 (or track 56) being moved, or (2) detect a change in the content of the play list folder/drop box 53 by comparing its content against an index of the play list folder 53 held at the local desktop application 50. This would be achieved via the aforementioned play list surveillance routine 61.

In order to confirm the removal of the play list 55, the user is firstly prompted. The identification 63 of the removed play list 55 is sent to the server 37. If the tracks 56 on the remove play list 55 were URL streams, the desktop application 50 initiates the transfer of the referenced files, and replaces the URL streams in the removed files with local file references.

The remote server 37 deletes the server instance of the play list 64. Based on user preference one of two things will occur, as follows: (1) the media files 59 are not deleted and are still accessible through the main library of the web application 65, or (2) the media files 59 are deleted from the server 37. The server 37 sends data to initiate the removal of all related play lists 55 on the nodal processing units 90 via the desktop application 50.

The user is prompted to elect whether (1) the play list 55 should be deleted from the local media player 52; (2) moved to the local media library and removed from the play list folder/drop-box 53; or (3) reverse the changes to the play list 55 on each nodal device 90. If the user decides to undo the removal, data is sent to the server 37 by the desktop application 50 re-creating the previously removed play lists 55/64. This process would be identical to methodology related to play list addition via drag-and-drop functionality.

Should the user elect to modify the content of a track 56, the application 50 will either (1) receive an event notification concerning a play list 55 or track 56 being modified, or (2) detect a change in the content of the play-list folder/drop box 53 by comparing its content against an index of the play list folder 53 stored at the host or local desktop application 50 via the aforementioned play list surveillance routine 61.

The desktop application 50 sends the data 67 required to update related tracks 56 along with the track identification 68 of the modified track 56. The server 37 then updates the related server instance of the track 62, and the relationship is identified using the global identification of the track 69. The server 37 then sends 71 data 70 to modify all other related tracks 56 on the nodal devices 90. Once the modification is complete it is reported back to the server 37, and any tickets related to the action are preferably removed. All synchronization conflicts are resolved and all unavailable devices are treated as heretofore described.

Should the user elect to modify the order of tracks 56 within a play list 55, the application 50 will either (1) receive an event notification concerning play list 55 or track 56 modification, or (2) detect a change in the content of the play list folder/drop box 53 by comparing its content against an index of the play list folder 53 held on the local desktop application 50 via the aforementioned play list surveillance routine 61.

The desktop application 50 sends data to the server 37 to re-order the server instance of the play list 64, and all related tracks 56 on the nodal devices 90. The noted data includes the local identifications of all the tracks 68 along with the order index. The server 37 then sends that data to all synced devices 90 to update all related play lists 55. Related lists 55 are identified via the play list global identification 66. Once the tracks 56 are re-ordered, the action is reported back to the server 37 and any tickets related to the action are preferably removed. All synchronization conflicts are resolved and all unavailable devices are treated as heretofore described.

Should the user elect to create, delete, remove, or add a track 56 via drag-and-drop functionality/methodology, the methodology will be performed in the same manner as play list 55 creation, deletion, removal, or addition. The only difference is that local track 56 and its identification 68 would replace the play list 55 and its identification 63; and the play list server instance 64 and its identification 66 would be replaced by the track server instance 62 and its identification 69. The data transmitted will be substantially different, but there would be no difference in process (i.e. the difference between the routines is not a difference in process but data).

In order to maintain control of media files and stream files on authorized devices one would need to imbed a unique identification (ID) that would identify the desktop application that created the URL stream. That desktop application would report the external Internet Protocol (IP) of the local computer consistently. If the external IP address of the device that is attempting to stream a song does not match the external IP of the desktop application the file is not served.

It is further contemplated that so-called "smart" play lists would incorporate the use of query logic instead of full length track synchronization. In this regard, the "smart" play lists would be handled in all cases like standard play lists except that instead of the tracks from the "smart" play list being synchronized, the query logic is stored. The smart play list will then use that query logic to run a query on the server 37 generating a play list consisting of files 59 held on the server 37 which are then streamed to the local media player 52 or downloaded via the desktop app 50. The play list is created on the local media player via the player API 54.

The user can also select to generate a smart play list from other users which the user adds to their account as a "friend"). Initially, the libraries of all "friends" are equally weighted in the query, but with time as the user rates the media to which he or she attends, the ratings that they provide will help weight the source libraries, to create a more effective smart play list. These media files are also stored on the server 37 but are associated with a different user account.

The so-called "friend" media files will be streamed in the same way as a simple smart play-list, it being noted that licensing agreements testifying to, or supporting the may well be conditions precedent to the methodology. It is very likely that these types of smart play lists will only be available for streaming. These rating can also be used to suggest music for purchase, based on the correlation between the user and "friends" music preferences.

It is noted that certain media players comprise application programming interfaces that are sensitive to mixed media/metadata and thus only provide partial support for URL track metadata (e.g. iTunes API). Accordingly, in certain API's (i.e. a mixed media/metadata-sensitive API as at 54'), there is a need to work around or bypass the mixed media/metadata-sensitive API 54' to support full metadata synchronization. In order to associate the metadata 33 with such mixed media/metadata sensitive API 54', the actual media/audio file is utilized.

To avoid storing unique files for each user's distinct metadata 33 (i.e. in order to continue file matching as substantially set forth in the '044 Application), it is contemplated that the media file data 14 must be separated from the metadata 33. To achieve this separation, two separate files are created when uploading files for URL stream as at 57'. The first file is one containing no metadata as at media-only file 80. The second file is a file with no media and metadata 33 only as at metadata-only file 81. It is contemplated that a file type for storing media duration data 82 and metadata 33 in the file header 83 may be preferably utilized (e.g. Apple Lossless audio codec).

In order to support full metadata support, the present invention contemplates two different synchronization processes, one that is automatic (a background process, that would synchronize playlist name, location, item deletion, track addition, etc. as generally depicted in FIG. 18(*a*), and one that is user-initiated hereinafter referred to as interval synchronization as generally depicted in FIG. 18(*b*). The interval synchronization process would require that the media player means 52' (having mixed media/metadata-sensitive API 54') be minimized.

Once the user initiates interval synchronization, the desktop application 50 notifies (as at 85) the server 37 that the client 86 is in interval sync. The server 37 will then re-direct the URL 87 from the media-only files 80 to the metadata-only files 81. The redirect 88 works by referencing a client ID stored within the URL field 87 of mixed media/metadata-sensitive URL stream tracks 84. If the state of the client 86 as stored in a database field 89 on the server 37 and referenced by the client ID indicates that interval synchronization is proper, the server 37 then redirects as at 88 to the metadata-only files 81. In order for this to work the media-only files 80 must have the same file extension as the metadata-only files 81.

It is contemplated that the default state of the URL 87 references the media-only files 80. In so doing, every time the user plays media the metadata 33 will not be pushed into the mixed media/metadata sensitive medial player 52', and thus will not replace possible user modifications. Once the URL 87 pointing to the media files has redirected, a temporary synchronization playlist is created consisting of all the tracks 84 that require synchronization (via the API 54'). The first track is then played via the API 54'. Given that these files contain no media data, and are relatively small, it takes less than a second to play through each track 84 (without an audible component).

When a file is played, the media player 52' imports the metadata 33 and duration data 82 of the file first and then proceeds to play the media. By creating metadata-only files 81 files that contain only metadata 33, the interval synchronization process can quickly push metadata 33 modifications without playing the audio. This effectively separates the metadata 33 and the media/audio data, allowing the application to continue file matching and maintain full metadata support.

Figure 22:
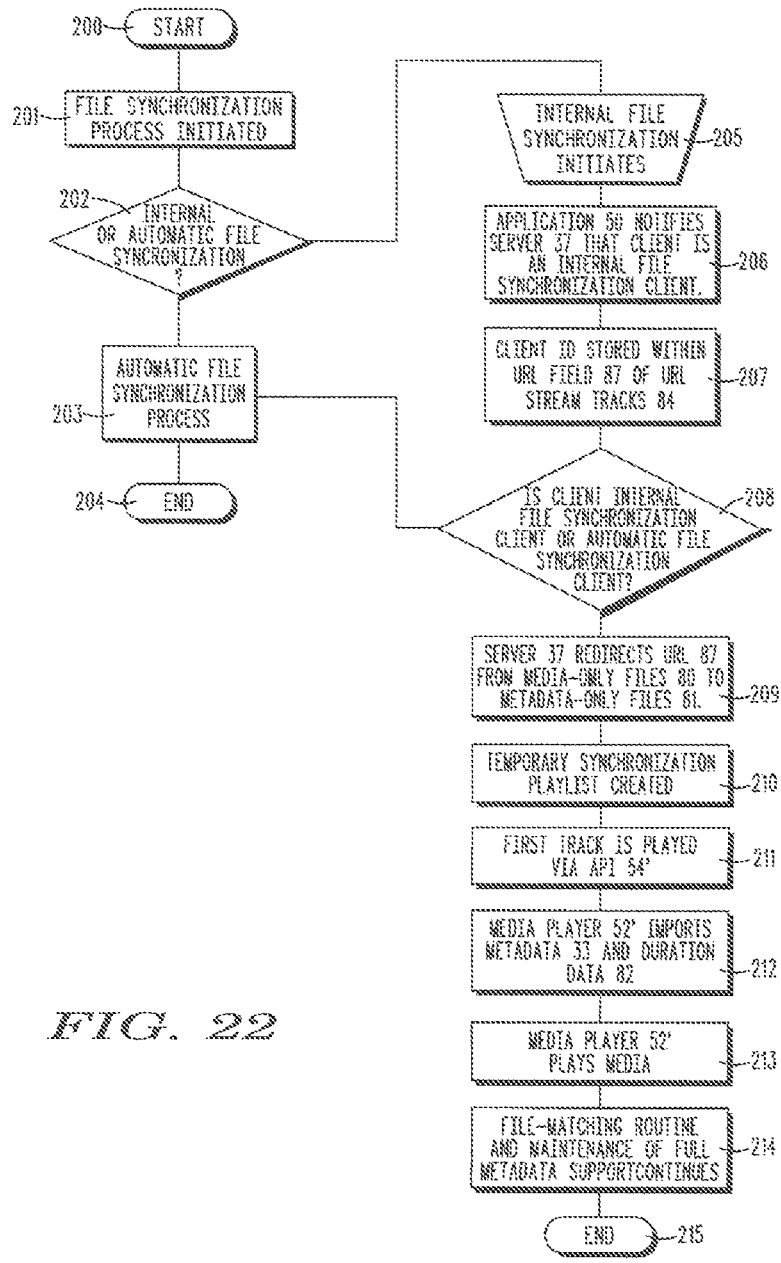
FIG. 22 is a flowchart type diagram showing a bifurcated file synchronization system whereby an automatic file synchronization routine is coupled to a user-initiated interval file synchronization routine.

The file synchronization system and methodology, according to the present invention thus contemplate a certain flow of events as generally depicted in FIG. 22. The desktop application 50, when started as at 200 begins a file synchronization process as at 201. A query as at 202 is made as to whether the client requires interval file synchronization or whether automatic file synchronization is more proper. If automatic file synchronization is more proper, the application 50 completes automatic file synchronization as at 203 and terminates as at 204.

If the client requires interval file synchronization, the user initiates as at 205 interval file synchronization, whereafter the application 50 notifies as at 206 the server 37 that the client is an interval file synchronization client. A client ID, stored within the URL field 87 of URL stream tracks 84, is referenced at 207, and a query as at 208 is made as to whether the client is interval file synchronization or an automatic file synchronization client. If the client is interval file synchronization client, the server 37 will redirect as at 209 the URL 87 from the media-only files 80 to the metadata-only files 81.

A temporary synchronization playlist (consisting of all the tracks 84 that require synchronization via the API 54') is created as at 210. The first track is then played as at 211 via the API 54'. The media player 52' imports as at 212 the metadata 33 and duration data 82, and then proceeds to play as at 213 the media whereafter the file matching routine and maintenance of full metadata support may continue as at 214 before termination as at 215.

While the foregoing specifications set forth much specificity, the same should not be construed as setting forth limits to the invention but rather as setting forth certain preferred embodiments and features. For example, as prefaced hereinabove, it is contemplated that the present inventive system and methodology essentially provide an audio or media file synchronization system for synchronizing audio/media files.

The audio/media file synchronization system according to the present invention is believed to essentially comprise certain remote processing means; certain host processing means; certain user interface means; certain media player means; certain play list surveillance means for monitoring play list changes and initiating file data synchronization; certain folder populating means; certain file transfer means; and certain file synchronization means.

The host processing means are in communication with the remote processing means, and the graphical user interface means are in communication with, and operable via said host processing means as are the media player means. The media player means comprise or cooperate with certain play list folder generation means for generating and/or visually displaying a drop box-enabled play list folder as at 53 upon the graphical user interface.

The folder populating means are operable via said host processing means for selectively populating said play list folder with (1) a dynamic audio/media file play list and (2) listed audio/media tracks associated with said audio/media file play list. The file transfer means are operable via the host processing means for transferring audio/media file data intermediate the remote and host processing means. The file synchronization means are operable via the host and remote processing means for synchronizing changes to the playlist folder with the remote processing means. Play list changes are believed preferably made via interface-enabled drag-and-drop functionality.

The synchronization means preferably comprise certain data extraction means associated with the host processing means for enabling waveform data extraction from audio/media file data; certain summary statistic derivation means associated with the host processing means for deriving summary statistics from extracted waveform data; certain custom marker generation means associated with the host processing means for generating a custom marker based on derived summary statistics; and certain marker association means associated with the host processing means for respectively associating generated custom markers with the audio/media file data for forming marked audio/media file data.

The audio/media file synchronization system further preferably comprise certain file storage means in communication with the host processing means for storing transferred audio/media file data; and certain data comparison means associated with the host processing means for comparing unmarked audio/media files to stored/marked audio/media files. The data comparison means may well function to access the custom markers when comparing unmarked audio/media file data with marked audio/media file data for outputting file match status.

The audio/media file synchronization may preferably further comprise certain nodal processing means in communication with the host processing means via the remote processing means such that the remote processing means enable updated play list synchronization with the nodal processing means. Certain conflict resolution means resolve by timestamp precedence any synchronization conflicts.

The audio/media file synchronization methodology for synchronizing audio/media files according to the present invention are believed to essentially comprise the steps of: monitoring audio/media file play list status within a drop box-enabled play list folder via host processing means; altering audio/media file play list status within said drop box-enabled play list folder; and comparing altered audio/media file play list status with monitored audio/media file play list status via synchronization means during a comparison inquiry.

Non-matching audio/media file data, as determined by the comparison inquiry, are then transferred to the remote processing means, whereafter an updated audio/media file play list is re-created at the remote processing means and a global identification is generated via the remote processing means thereby linking the remote processing means with the host processing means and nodal processing means. Audio/media file data are then transferred to the nodal processing means via the remote processing and synchronization means for synchronizing audio/media file data between the host and nodal processing means.

The comparison inquiry notably comprises the steps of: analyzing an audio/media file via analysis means, the audio/media file having a series of wave properties, the wave properties each having a calculable wave value; calculating wave values from the wave properties via the analysis means, the wave values comprising length segment values; calculating mean, range, and standard deviation values for the length segment values; generating an array of values based on the calculated mean, range, and standard deviation values; generating a file-identifying fingerprint based on the array of values; and associating the file-identifying fingerprint with the audio/media file for enabling subsequent file matching.

Accordingly, although the present invention has been described by reference to certain preferred systemic arrangements and certain methodologies, it is not intended that the novel arrangements and methods be limited thereby, but that modifications thereof are intended to be included as falling within the broad scope and spirit of the foregoing disclosures and the appended drawings.

We claim:

1. A media file synchronization system for synchronizing media files, the media file synchronization system comprising:
   remote data processing means;
   host data processing means in communication with the remote data processing means, the host data processing means comprising identifier redirection means;
   a user interface in communication with, and operable via said host data processing means;
   media player means operable via said host data processing means, the media player means comprising play list folder generation means, the play list folder generation means for visually displaying a drop box-enabled play list folder upon the user interface;
   folder populating means operable via said host data processing means for selectively populating said play list folder with (1) a dynamic media file play list and (2) listed tracks associated with said media file play list;
   file transfer means operable via the host and remote data processing means for transferring media file data intermediate the remote and host data processing means;
   data extraction means associated with the host data processing means for enabling sinusoidal waveform data extraction from media file data the sinusoidal waveform data extraction being relative to a data extraction baseline for extracting trough-to-baseline and peak-to-baseline length segment values;
   summary statistic derivation means associated with the host data processing means for deriving calculated statistical values for the trough-to-baseline and peak-to-baseline length segment values, the calculated statistical values being for the trough-to-baseline and peak-to-baseline length segment values;
   custom marker generation means, the custom marker generation means being associated with the host data processing means for generating a custom marker based on derived summary statistics;
   marker association means associated with the host data processing means for respectively associating generated custom markers with the media file data for forming marked media file data; and
   file synchronization means operable via the host and remote data processing means for synchronizing changes to the playlist folder, the file synchronization means comprising automatic file synchronization means and interval file synchronization means, the media file data comprising mixed media/metadata files, media-only files, and metadata-only files, the automatic file synchronization means being cooperable with the mixed media/metadata files, the interval file synchronization means being cooperable with the media-only and metadata-only files, the interval file synchronization means, when initiated, prompting identifier redirection via the identifier redirection means from the media-only files to the metadata-only files.

2. The media file synchronization system of claim 1 comprising interface-enabled means for dragging and dropping playlist changes to/from said playlist folder.

3. The media file synchronization system of claim 2 comprising file storage means in communication with the host data processing means for storing transferred media file data.

4. The media file synchronization system of claim 3 comprising data comparison means, the data comparison means being associated with the host data processing means for comparing unmarked media files to stored/marked media files, the data comparison means accessing the custom markers when comparing unmarked media file data with marked media file data for outputting file match status.

5. The media file synchronization system of claim 1 wherein the sinusoidal waveform data are time dependent, the data extraction means for extracting time-based derivative wave values from the sinusoidal waveform data, the summary statistic derivation means for deriving calculated statistics for the time-based derivative wave values.

6. The media file synchronization system of claim 1 comprising value sampling means, the value sampling means being associated with the host data processing means for deriving a value sampling from the calculated statistical values.

7. The media file synchronization system of claim 6 wherein the value sampling means randomly collect the value sampling from a number of select data points associated with the calculated statistical values.

8. The media file synchronization system of claim 6 wherein the value sampling means randomly collect the value sampling by averaging three select data points associated with the calculated statistical values.

9. The media file synchronization system of claim 1 comprising nodal data processing means, the host data processing means being in communication with the nodal data processing means for enabling updated play list synchronization with the nodal data processing means from the host data processing means.

10. The media file synchronization system of claim 9 comprising conflict resolution means for resolving by timestamp precedence synchronization conflicts.

11. The media file synchronization system of claim 2 comprising play list surveillance means for monitoring play list changes and initiating file data synchronization.

12. A media file synchronization system for synchronizing media files, the media file synchronization system comprising:

> host data processing means, the host data processing means comprising identifier redirection means;
>
> a user interface in communication with, and operable via said host data processing means;
>
> media player means operable via said host data processing means, the media player means comprising play list folder visualization means for visually displaying a drop box-enabled play list folder upon the user interface;
>
> folder populating means operable via said host processing means for selectively populating said play list folder with a dynamic play list and listed tracks associated with said play list;
>
> file transfer means operable via the host data processing means for transferring media file data from the host data processing means;
>
> data extraction means, the data extraction means being associated with the host data processing means for enabling sinusoidal waveform data extraction from media file data, the waveform data comprising length segment values, the waveform data extraction being relative to a data extraction baseline for extracting trough-to-baseline and peak-to-baseline length segment values;
>
> summary statistic derivation means, the summary statistic derivation means being associated with the host data processing means for deriving calculated statistical values for the trough-to-baseline and peak-to-baseline length segment values;
>
> custom marker generation means, the custom marker generation means being associated with the host data processing means for generating a custom marker based on derived summary statistics;
>
> marker association means, the marker association means being associated with the host data processing means for respectively associating generated custom markers with the media file data for forming marked media file data; and
>
> file synchronization means for synchronizing dragged playlist changes with said playlist folder, the file synchronization means comprising automatic file synchronization means and interval file synchronization means, the media file data comprising mixed media/metadata files, media-only files, and metadata-only files, the automatic file synchronization means being cooperable with the mixed media/metadata files, the interval file synchronization means being cooperable with the media-only and metadata-only files, the interval file synchronization means, when initiated, prompting identifier redirection via the identifier redirection means from the media-only files to the metadata-only files.

13. A media file synchronization method for synchronizing media files, the method comprising the steps of:

> monitoring media play list status within a drop box-enabled play list folder at host processing means;
>
> altering media play list status within said drop box-enabled play list folder;
>
> conducting a comparison inquiry, the comparison inquiry comprising the steps of:
>
>> extracting sinusoidal waveform data from a first media file via data extraction means, the extracted sinusoidal waveform data being extracted relative to a data extraction baseline, the extracted sinusoidal waveform data including trough-to-baseline and peak-to-baseline length segment values;
>>
>> deriving mean, range, and standard deviation summary statistics from the extracted trough-to-baseline and peak-to-baseline length segment values;
>>
>> generating a custom marker based on the derived mean, range, and standard deviation summary statistics;
>>
>> associating the custom marker with the first media file thereby constructing a marked media file; and
>>
>> accessing the custom marker when comparing a second media file to the marked media file for rendering a positive media file match;
>
> transferring altered media file data determined from the comparison inquiry to remote data processing means for synchronizing media file data between the host and remote data processing means, the media file data comprising mixed media/metadata files, media-only files, and metadata-only files, the transferred altered media file data being selectively transferred depending on file type;
>
> cooperating automatic file synchronization means with the mixed media/metadata files for effecting file synchronization; and
>
> cooperating interval file synchronization means with the media-only files and metadata-only files for effecting file synchronization, the interval file synchronization means, when initiated, prompting identifier redirection via identifier redirection means from the media-only files to the metadata-only files.

* * * * *